US011008031B1

(12) United States Patent
Coates

(10) Patent No.: US 11,008,031 B1
(45) Date of Patent: May 18, 2021

(54) REUSABLE SHOPPING BAG

(71) Applicant: Macah Coates, Philadelphia, PA (US)

(72) Inventor: Macah Coates, Philadelphia, PA (US)

( * ) Notice: Subject to any disclaimer, the term of this patent is extended or adjusted under 35 U.S.C. 154(b) by 0 days.

(21) Appl. No.: 16/545,024

(22) Filed: Aug. 20, 2019

(51) Int. Cl.
A45C 3/04 (2006.01)
B62B 5/06 (2006.01)
B62B 3/02 (2006.01)
A45C 5/14 (2006.01)
A45C 7/00 (2006.01)
B62B 3/14 (2006.01)
B62B 3/00 (2006.01)
A45C 13/02 (2006.01)

(52) U.S. Cl.
CPC ............... B62B 3/027 (2013.01); A45C 3/04 (2013.01); A45C 5/14 (2013.01); A45C 7/0077 (2013.01); A45C 13/02 (2013.01); B62B 3/002 (2013.01); B62B 3/146 (2013.01); B62B 3/1492 (2013.01); B62B 5/06 (2013.01)

(58) Field of Classification Search
CPC ......... B62B 3/027; B62B 3/002; B62B 3/146; B62B 3/1492; B62B 5/06; A45C 3/04; A45C 5/14; A45C 7/0077; A45C 13/02
See application file for complete search history.

(56) References Cited

U.S. PATENT DOCUMENTS 5,046,860 A    9/1991  Brennan
5,182,895 A    2/1993  Lugo
5,209,385 A    5/1993  Ledesma
5,531,366 A    7/1996  Strom
6,206,224 B1 * 3/2001  Potts ................ B62B 3/1464
                                                220/23.86
7,958,920 B1   6/2011  Olsson
8,979,115 B1 * 3/2015  Baron ................ B62B 3/027
                                                280/651
9,144,278 B2   9/2015  Morrow
D831,959 S    10/2018  Hollinger
2007/0278768 A1* 12/2007 Lynam ................ A45C 9/00
                                                280/651
2012/0013090 A1*  1/2012 Musi ................. B62B 1/006
                                                280/47.34

FOREIGN PATENT DOCUMENTS

WO    WO-2010112706 A1 * 10/2010 ........... B62B 5/0023
WO       2016123647        8/2016

* cited by examiner

Primary Examiner — Bryan A Evans
(74) Attorney, Agent, or Firm — Kyle A. Fletcher, Esq.

(57) ABSTRACT

The reusable shopping bag is a cart. The reusable shopping bag is a collapsible structure. The storage facility of the reusable shopping bag is segmented. The reusable shopping bag comprises a multi-pan containment structure, a plurality of handles, a wheel structure, and a plurality of hook and loop fasteners. The plurality of handles, the wheel structure, and the plurality of hook and loop fasteners attach to the multi-pan containment structure. Each of the plurality of handles is a grip used to transport and manipulate the reusable shopping bag. The wheel structure removably attaches to the multi-pan containment structure. The plurality of hook and loop fasteners performs a function selected from the group consisting of: a) removably attaching the wheel structure to the multi-pan containment structure; and, b) securing the multi-pan containment structure into a collapsed position selected from a plurality of collapsed positions.

13 Claims, 6 Drawing Sheets

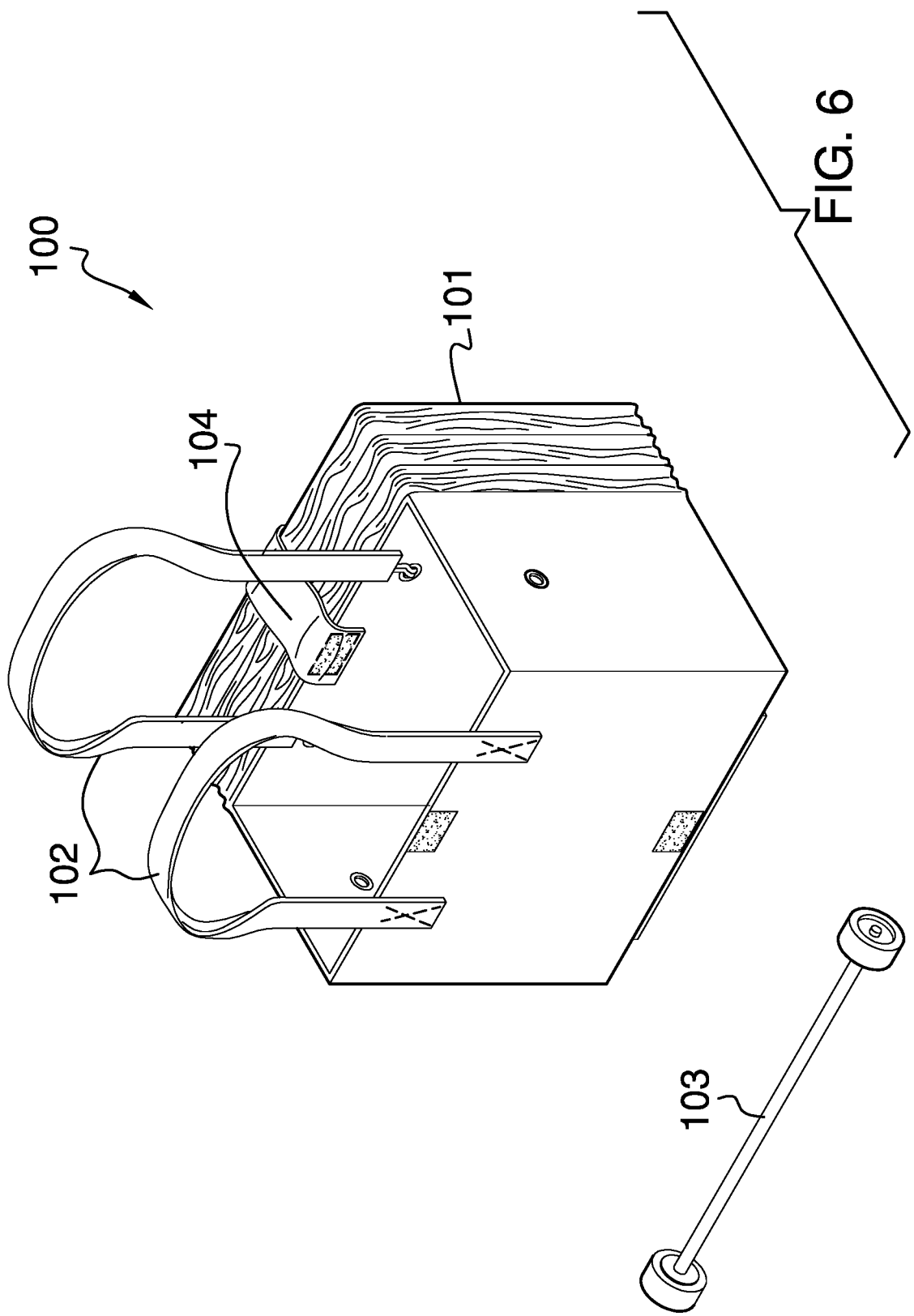

REUSABLE SHOPPING BAG

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hand-carried bags including collapsible bags, more specifically, a flexible hand bag with modular storage compartments. (A45C7/009)

SUMMARY OF INVENTION

The reusable shopping bag is a cart. The reusable shopping bag is a container used to transport domestic articles. The reusable shopping bag is a rolling structure. The reusable shopping bag is a collapsible structure. The storage facility of the reusable shopping bag is segmented such that domestic articles contained in the reusable shopping bag can be segregated within the reusable shopping bag. The reusable shopping bag comprises a multi-pan containment structure, a plurality of handles, a wheel structure, and a plurality of hook and loop fasteners. The plurality of handles, the wheel structure, and the plurality of hook and loop fasteners attach to the multi-pan containment structure. The multi-pan containment structure stores the domestic articles during transport. The multi-pan containment structure is collapsible. The containment space in each pan contained in the multi-pan containment structure is isolated from the containment space of the other pans contained in the multi-pan containment structure. Each of the plurality of handles is a grip used to transport and manipulate the reusable shopping bag. The wheel structure removably attaches to the multi-pan containment structure. The wheel structure allows the reusable shopping bag to roll. The plurality of hook and loop fasteners performs a function selected from the group consisting of: a) removably attaching the wheel structure to the multi-pan containment structure; and, b) securing the multi-pan containment structure into a collapsed position selected from a plurality of collapsed positions.

These together with additional objects, features and advantages of the reusable shopping bag will be readily apparent to those of ordinary skill in the art upon reading the following detailed description of the presently preferred, but nonetheless illustrative, embodiments when taken in conjunction with the accompanying drawings.

In this respect, before explaining the current embodiments of the reusable shopping bag in detail, it is to be understood that the reusable shopping bag is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the reusable shopping bag. It is therefore important that the claims be regarded as including such equivalent construction insofar as they do not depart from the spirit and scope of the reusable shopping bag. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 6 is a perspective view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
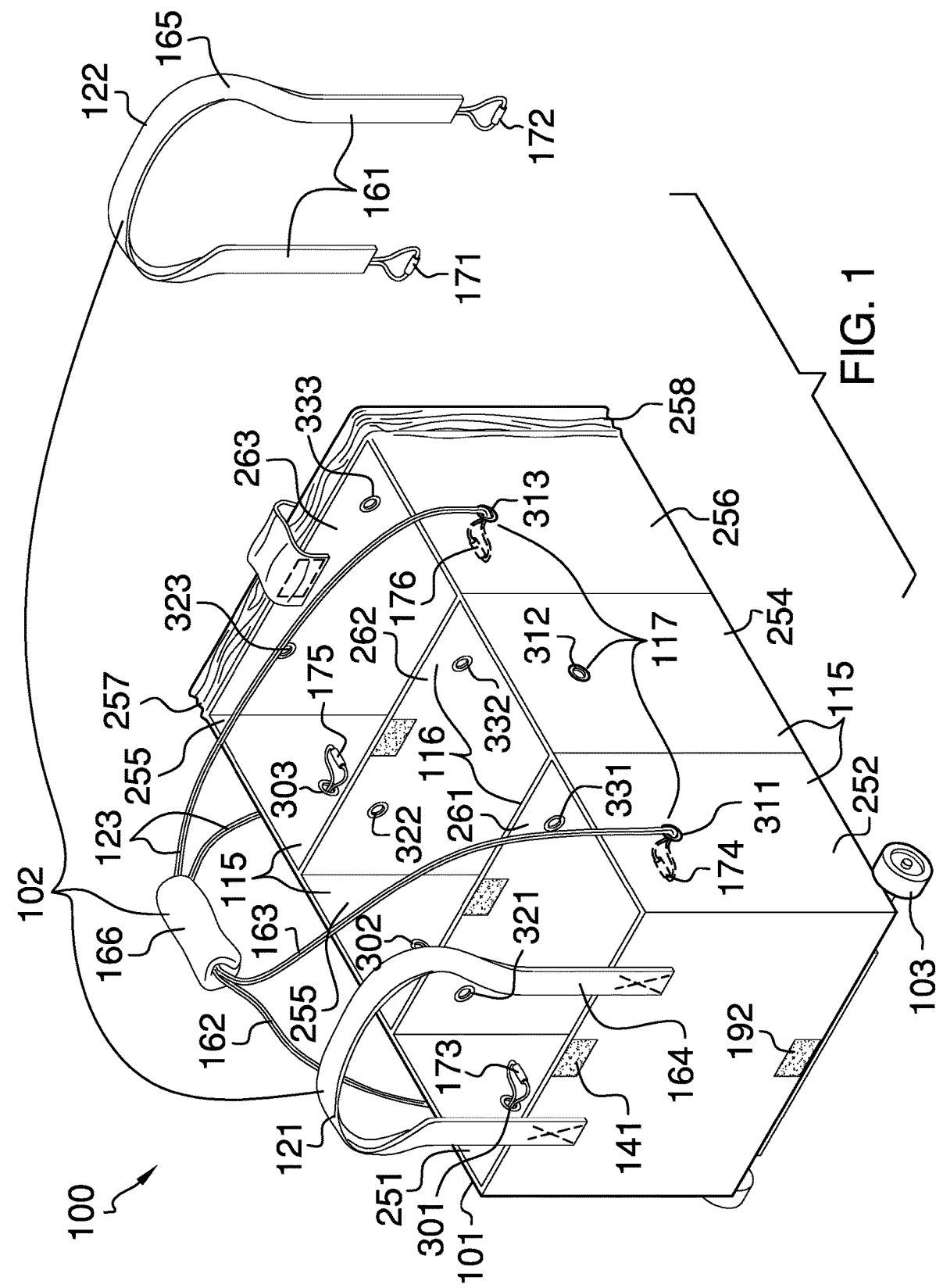
FIG. 1 is a perspective view of an embodiment of the disclosure.
Figure 2:
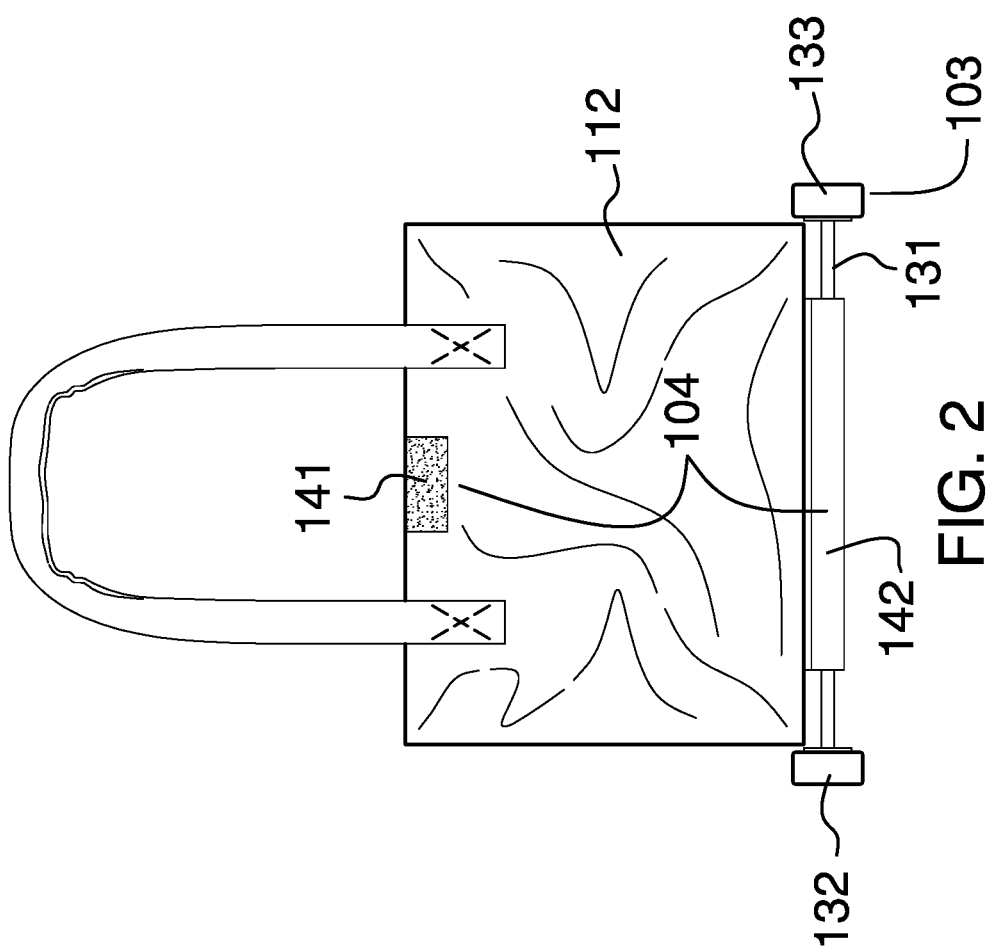
FIG. 2 is a posterior view of an embodiment of the disclosure.
Figure 3:
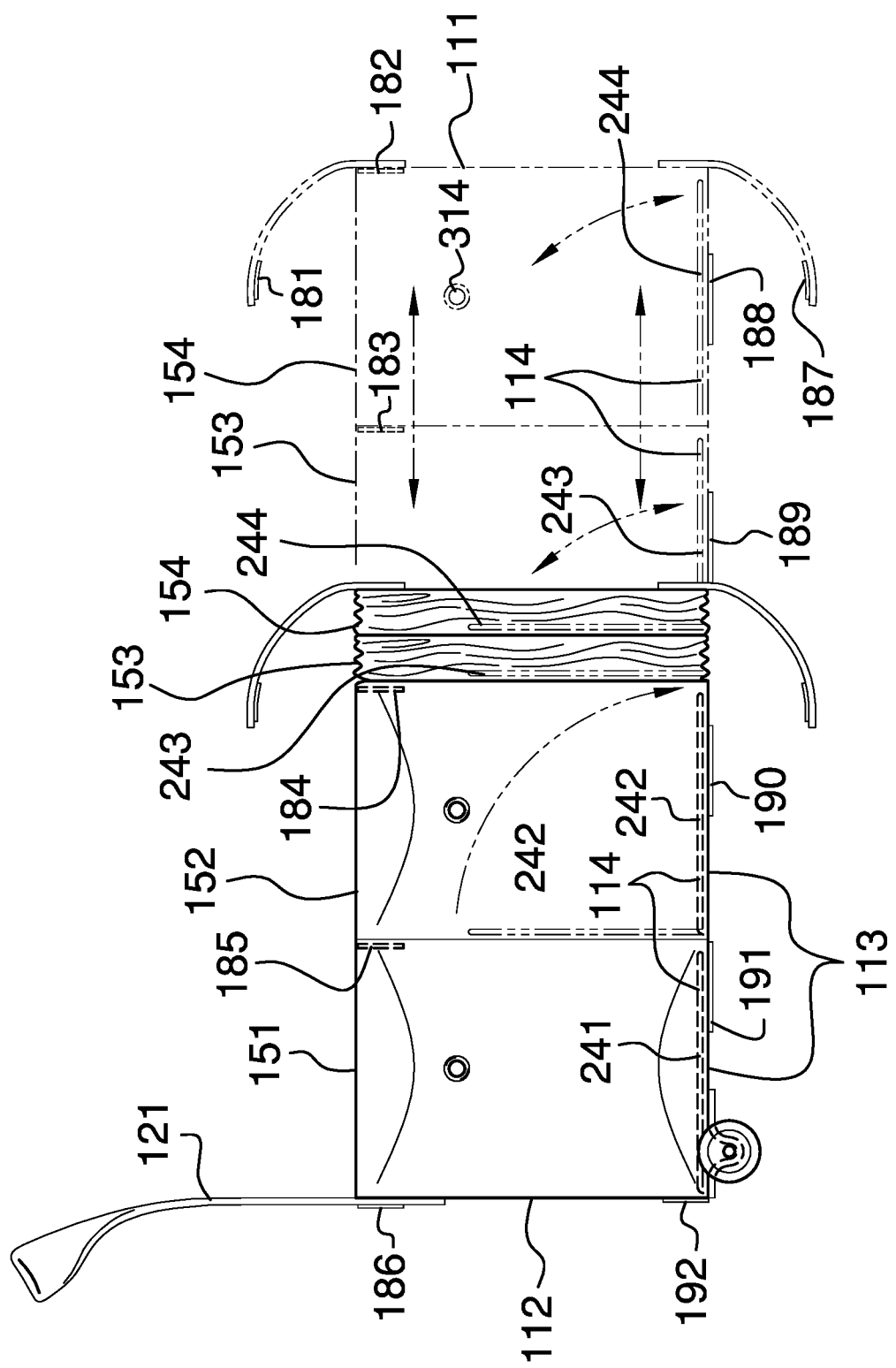
FIG. 3 is a side view of an embodiment of the disclosure.
Figure 4:
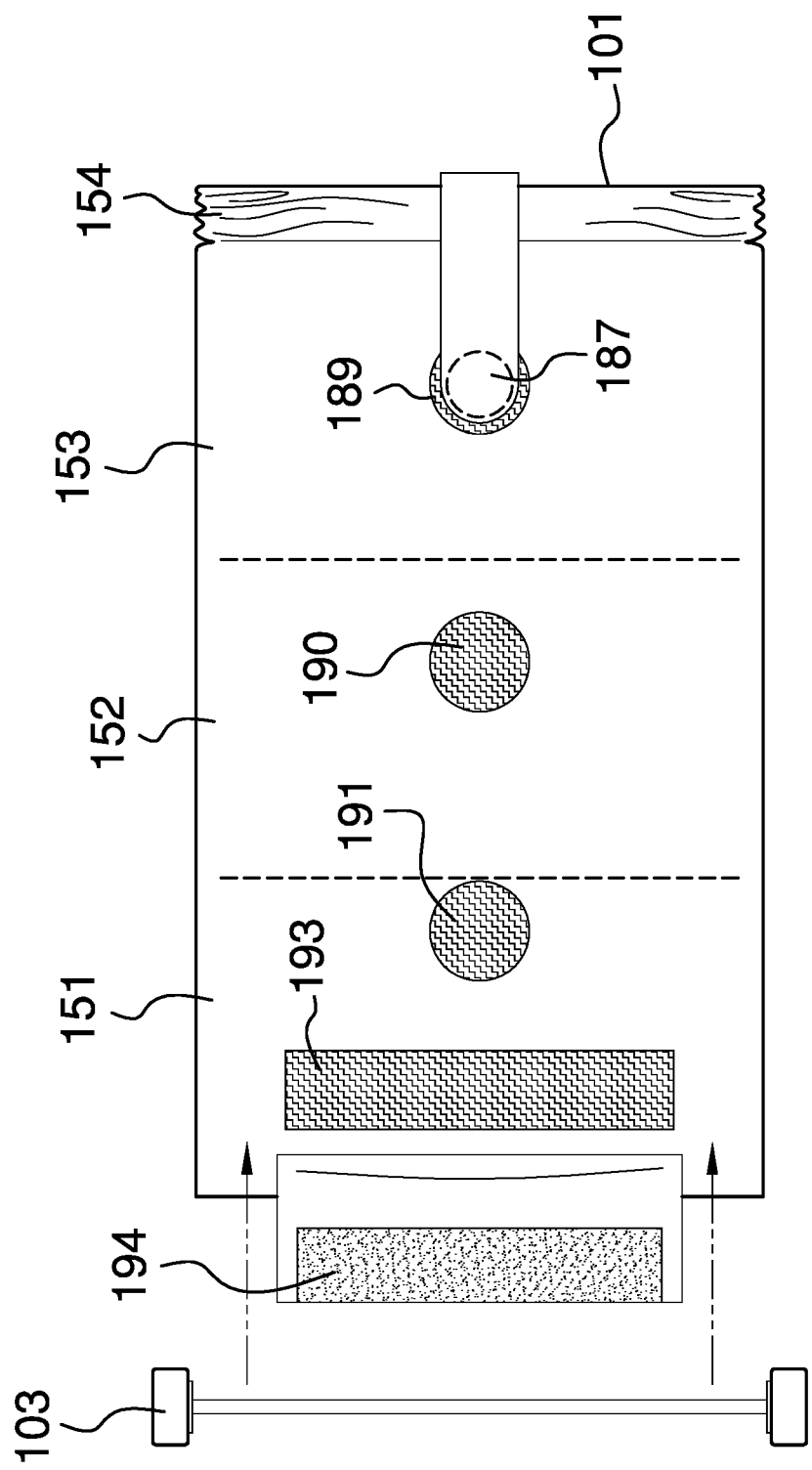
FIG. 4 is a bottom view of an embodiment of the disclosure.
Figure 5:
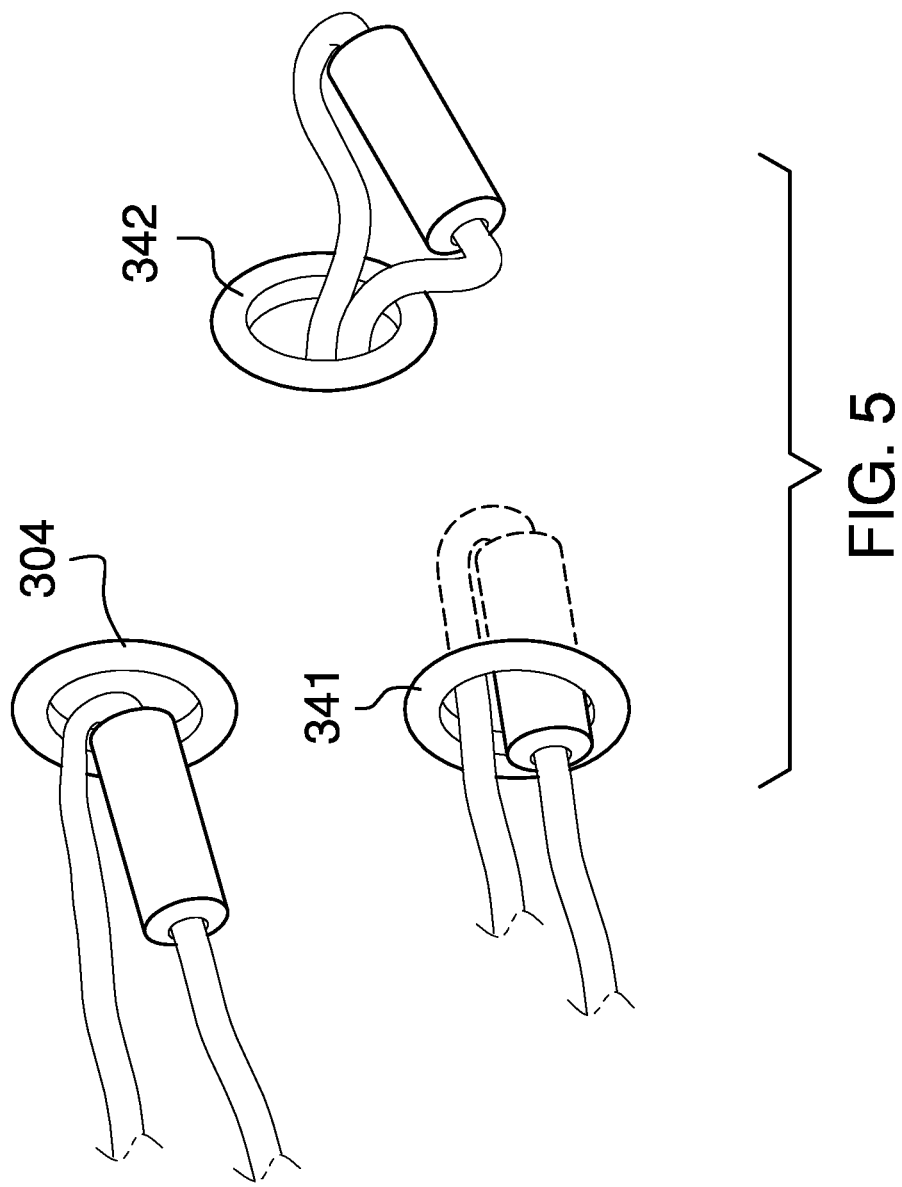
FIG. 5 is a detail view of an embodiment of the disclosure.

Detailed reference will now be made to one or more potential embodiments of the disclosure, which are illustrated in FIGS. 1 through 6.

The reusable shopping bag 100 (hereinafter invention) is a cart. The invention 100 is a container used to transport domestic articles. The invention 100 is a rolling structure. The invention 100 is a collapsible structure. The storage facility of the invention 100 is segmented such that domestic articles contained in the invention 100 can be segregated within the invention 100. The invention 100 comprises a multi-pan containment structure 101, a plurality of handles 102, a wheel structure 103, and a plurality of hook and loop fasteners 104. The plurality of handles 102, the wheel structure 103, and the plurality of hook and loop fasteners 104 attach to the multi-pan containment structure 101. The multi-pan containment structure 101 stores the domestic articles during transport. The multi-pan containment structure 101 is collapsible. The containment space in each pan contained in the multi-pan containment structure 101 is isolated from the containment space of the other pans contained in the multi-pan containment structure 101. Each of the plurality of handles 102 is a grip used to transport and manipulate the invention 100. The wheel structure 103 removably attaches to the multi-pan containment structure 101. The wheel structure 103 allows the invention 100 to roll. The plurality of hook and loop fasteners 104 performs a function selected from the group consisting of: a) removably attaching the wheel structure 103 to the multi-pan containment structure 101; and, b) securing the multi-pan containment structure 101 into a collapsed position selected from a plurality of collapsed positions.

The multi-pan containment structure 101 is a containment vessel. The multi-pan containment structure 101 is a prism-shaped structure. The multi-pan containment structure 101 is a hollow structure. The multi-pan containment structure 101 forms a rectangular block structure. The multi-pan containment structure 101 is formed from a plurality rectangular pans. The multi-pan containment structure 101 forms the storage space provided by the invention 100. The rectangular pans in the multi-pan containment structure 101 combine to form the plurality of segregated storage spaces formed within the multi-pan containment structure 101. Each pan in the multi-pan containment structure 101 is collapsible. The multi-pan containment structure 101 collapses by collapsing each pan within the multi-pan containment structure 101. The multi-pan containment structure 101 comprises an anterior panel 111, a posterior panel 112, an inferior shell 113, a plurality of inferior panels 114, a plurality of lateral panels 115, a plurality of medial panels 116, and a plurality of grommets 117.

The anterior panel 111 is a rectangular disk-shaped structure. The anterior panel 111 is a semi-rigid structure. The anterior panel 111 forms a portion of the vertical containment of multi-pan containment structure 101 when the multi-pan containment structure 101 is used for storage. The anterior panel 111 is the surface of the multi-pan containment structure 101 that leads the multi-pan containment structure 101 into the primary sense of direction of the multi-pan containment structure 101.

The posterior panel 112 is a rectangular disk-shaped structure. The posterior panel 112 is a rigid structure. The posterior panel 112 forms a portion of the vertical containment of multi-pan containment structure 101 when the multi-pan containment structure 101 is used for storage. The posterior panel 112 is the surface of the multi-pan containment structure 101 that is distal from the multi-pan containment structure 101.

The inferior shell 113 is a sheeting that forms the exterior face of the inferior surface of the multi-pan containment structure 101. The inferior shell 113 is a textile-based sheeting. The inferior shell 113 supports each of the plurality of inferior panels 114 when the selected inferior panel is in an expanded position.

Each of the plurality of inferior panels 114 forms a supporting surface within a storage pan selected from the multi-pan containment structure 101. Each of the plurality of inferior panels 114 forms the inferior containment surface of its associated storage pan. Each of the plurality of inferior panels 114 attaches to a panel selected from the group consisting of the plurality of medial panels 116 and the posterior panel 112. During the collapse of the storage pan associated with an inferior panel selected from the plurality of inferior panels 114, the selected inferior panel will rotate from a position perpendicular to the attached selected panel to a position perpendicular to the attached selected panel. The direction of rotation of each of the plurality of inferior panels 114 is towards the posterior panel 112. The plurality of inferior panels 114 comprises a first inferior panel 241, a second inferior panel 242, a third inferior panel 243, and a fourth inferior panel 244.

The first inferior panel 241 is a rigid rectangular panel structure. The first inferior panel 241 has a disk shape. The first inferior panel 241 forms the inferior supporting surface of the first storage pan 151 of the multi-pan containment structure 101. The rotation of the first inferior panel 241 is limited by the inferior shell 113. The first inferior panel 241 is supported by the inferior shell 113.

The second inferior panel 242 is a rigid rectangular panel structure. The second inferior panel 242 has a disk shape. The second inferior panel 242 forms the inferior supporting surface of the second storage pan 152 of the multi-pan containment structure 101. The rotation of the second inferior panel 242 is limited by the inferior shell 113. The second inferior panel 242 is supported by the inferior shell 113.

The third inferior panel 243 is a rigid rectangular panel structure. The third inferior panel 243 has a disk shape. The third inferior panel 243 forms the inferior supporting surface of the third storage pan 153 of the multi-pan containment structure 101. The rotation of the third inferior panel 243 is limited by the inferior shell 113. The third inferior panel 243 is supported by the inferior shell 113.

The fourth inferior panel 244 is a rigid rectangular panel structure. The fourth inferior panel 244 has a disk shape. The fourth inferior panel 244 forms the inferior supporting surface of the fourth storage pan 154 of the multi-pan containment structure 101. The rotation of the fourth inferior panel 244 is limited by the inferior shell 113. The fourth inferior panel 244 is supported by the inferior shell 113.

Each of the plurality of lateral panels 115 is a rectangular disk-shaped structure. Each of the plurality of lateral panels 115 is a flexible structure. The plurality of lateral panels 115 is textile-based sheeting. The plurality of lateral panels 115 forms a portion of the vertical containment of multi-pan containment structure 101 when the multi-pan containment structure 101 is used for storage. The plurality of lateral panels 115 form the lateral vertical surfaces of the multi-pan containment structure 101. The plurality of lateral panels 115 comprises a first lateral panel 251, a second lateral panel 252, a third lateral panel 253, a fourth lateral panel 254, a fifth lateral panel 255, a sixth lateral panel 256, a seventh lateral panel 257, and an eighth lateral panel 258.

The first lateral panel 251 is a flexible textile sheeting. The first lateral panel 251 forms the port side vertical boundary of the space contained by the first storage pan 151. The second lateral panel 252 is a flexible textile sheeting. The second lateral panel 252 forms the starboard side vertical boundary of the space contained by the first storage pan 151.

The third lateral panel 253 is a flexible textile sheeting. The third lateral panel 253 forms the port side vertical boundary of the space contained by the second storage pan 152. The fourth lateral panel 254 is a flexible textile sheeting. The fourth lateral panel 254 forms the starboard side vertical boundary of the space contained by the second storage pan 152.

The fifth lateral panel 255 is a flexible textile sheeting. The fifth lateral panel 255 forms the port side vertical boundary of the space contained by the third storage pan 153. The sixth lateral panel 256 is a flexible textile sheeting. The sixth lateral panel 256 forms the starboard side vertical boundary of the space contained by the third storage pan 153.

The seventh lateral panel 257 is a flexible textile sheeting. The seventh lateral panel 257 forms the port side vertical boundary of the space contained by the fourth storage pan 154. The eighth lateral panel 258 is a flexible textile sheeting. The eighth lateral panel 258 forms the starboard side vertical boundary of the space contained by the fourth storage pan 154.

Each of the plurality of medial panels 116 is a rectangular disk-shaped structure. Each of the plurality of medial panels 116 is a semi-rigid structure. Each of the plurality of medial panels 116 installs within the hollow interior of the multi-pan containment structure 101 such that the faces of the disk structure of each of the plurality of medial panels 116 are perpendicular to the faces of the disk structure of each of the plurality of lateral panels 115.

Each of the plurality of medial panels 116 segregates the hollow interior storage space formed by the exterior surfaces of the multi-pan containment structure 101 into individually segregated storage pans. The faces of the disk-structure of each of the plurality of medial panels 116 are parallel to each other. The faces of the disk-structure of each of the plurality of medial panels 116 are parallel to the anterior panel 111. The faces of the disk-structure of each of the plurality of medial panels 116 are parallel to the posterior panel 112.

The plurality of medial panels 116 comprises a first medial panel 261, a second medial panel 262, and a third medial panel 263.

The first medial panel 261 is a semi-rigid rectangular panel structure. The first medial panel 261 forms the vertical boundary of between the spaces contained by the first storage pan 151 and the second storage pan 152. The second medial panel 262 is a semi-rigid rectangular panel structure. The second medial panel 262 forms the vertical boundary of between the spaces contained by the second storage pan 152 and the third storage pan 153. The third medial panel 263 is a semi-rigid rectangular panel structure. The third medial panel 263 forms the vertical boundary of between the spaces contained by the third storage pan 153 and the fourth storage pan 154.

Each of the plurality of grommets 117 is a protected aperture formed through a panel selected from the group consisting of anterior panel 111, the plurality of lateral panels 115, and the plurality of medial panels 116. By protected is meant that each of the plurality of grommets 117 is protected by an eyelet that ensures the integrity of the edges of the aperture formed by any selected grommet. Each of the plurality of grommets 117 forms an anchor point to which a handle selected from the plurality of handles 102 attaches.

The plurality of grommets 117 comprises a first lateral port grommet 301, a second lateral port grommet 302, a third lateral port grommet 303, a fourth lateral port grommet 304, a first lateral starboard grommet 311, a second lateral starboard grommet 312, a third lateral starboard grommet 313, a fourth lateral starboard grommet 314, a first medial port grommet 321, a second medial port grommet 322, a third medial port grommet 323, a first medial starboard grommet 331, a second medial starboard grommet 332, a third medial starboard grommet 333, a first anterior port grommet 341, and a first anterior starboard grommet 342.

The first lateral port grommet 301 is a grommet that is formed through the first lateral panel 251. The first lateral port grommet 301 receives a stopper tube selected from the group consisting of the third stopper tube 173, the fourth stopper tube 174, the fifth stopper tube 175, and the sixth stopper tube 176 to attach the lateral handle 123 to the multi-pan containment structure 101.

The second lateral port grommet 302 is a grommet that is formed through the third lateral panel 253. The second lateral port grommet 302 receives a stopper tube selected from the group consisting of the third stopper tube 173, the fourth stopper tube 174, the fifth stopper tube 175, and the sixth stopper tube 176 to attach the lateral handle 123 to the multi-pan containment structure 101.

The third lateral port grommet 303 is a grommet that is formed through the fifth lateral panel 255. The third lateral port grommet 303 receives a stopper tube selected from the group consisting of the third stopper tube 173, the fourth stopper tube 174, the fifth stopper tube 175, and the sixth stopper tube 176 to attach the lateral handle 123 to the multi-pan containment structure 101.

The fourth lateral port grommet 304 is a grommet that is formed through the seventh lateral panel 257. The fourth lateral port grommet 304 receives a stopper tube selected from the group consisting of the third stopper tube 173, the fourth stopper tube 174, the fifth stopper tube 175, and the sixth stopper tube 176 to attach the lateral handle 123 to the multi-pan containment structure 101.

The first lateral starboard grommet 311 is a grommet that is formed through the second lateral panel 252. The first lateral starboard grommet 311 receives a stopper tube selected from the group consisting of the third stopper tube 173, the fourth stopper tube 174, the fifth stopper tube 175, and the sixth stopper tube 176 to attach the lateral handle 123 to the multi-pan containment structure 101.

The second lateral starboard grommet 312 is a grommet that is formed through the fourth lateral panel 254. The second lateral starboard grommet 312 receives a stopper tube selected from the group consisting of the third stopper tube 173, the fourth stopper tube 174, the fifth stopper tube 175, and the sixth stopper tube 176 to attach the lateral handle 123 to the multi-pan containment structure 101.

The third lateral starboard grommet 313 is a grommet that is formed through the sixth lateral panel 256. The third lateral starboard grommet 313 receives a stopper tube selected from the group consisting of the third stopper tube 173, the fourth stopper tube 174, the fifth stopper tube 175, and the sixth stopper tube 176 to attach the lateral handle 123 to the multi-pan containment structure 101.

The fourth lateral starboard grommet 314 is a grommet that is formed through the eighth lateral panel 258. The fourth lateral starboard grommet 314 receives a stopper tube selected from the group consisting of the third stopper tube 173, the fourth stopper tube 174, the fifth stopper tube 175, and the sixth stopper tube 176 to attach the lateral handle 123 to the multi-pan containment structure 101.

The first medial port grommet 321 is a grommet that is formed through the port half of the first medial panel 261. The first medial port grommet 321 receives a stopper tube selected from the group consisting of the first stopper tube 171 and the second stopper tube 172 to attach the anterior handle 122 to the multi-pan containment structure 101.

The second medial port grommet 322 is a grommet that is formed through the port half of the second medial panel 262. The second medial port grommet 322 receives a stopper tube selected from the group consisting of the first stopper tube 171 and the second stopper tube 172 to attach the anterior handle 122 to the multi-pan containment structure 101.

The third medial port grommet 323 is a grommet that is formed through the port half of the third medial panel 263. The third medial port grommet 323 receives a stopper tube selected from the group consisting of the first stopper tube 171 and the second stopper tube 172 to attach the anterior handle 122 to the multi-pan containment structure 101.

The first medial starboard grommet 331 is a grommet that is formed through the starboard half of the first medial panel 261. The first medial starboard grommet 331 receives a stopper tube selected from the group consisting of the first stopper tube 171 and the second stopper tube 172 to attach the anterior handle 122 to the multi-pan containment structure 101.

The second medial starboard grommet 332 is a grommet that is formed through the starboard half of the second medial panel 262. The second medial starboard grommet 332 receives a stopper tube selected from the group consisting of the first stopper tube 171 and the second stopper tube 172 to attach the anterior handle 122 to the multi-pan containment structure 101.

The third medial starboard grommet 333 is a grommet that is formed through the starboard half of the third medial panel 263. The third medial starboard grommet 333 receives a stopper tube selected from the group consisting of the first stopper tube 171 and the second stopper tube 172 to attach the anterior handle 122 to the multi-pan containment structure 101.

The first anterior port grommet 341 is a grommet that is formed through the port half of the anterior panel 111. The first anterior port grommet 341 receives a stopper tube selected from the group consisting of the first stopper tube 171 and the second stopper tube 172 to attach the anterior handle 122 to the multi-pan containment structure 101.

The first anterior starboard grommet 342 is a grommet that is formed through the starboard half of the anterior panel 111. The first anterior starboard grommet 342 receives a stopper tube selected from the group consisting of the first stopper tube 171 and the second stopper tube 172 to attach the anterior handle 122 to the multi-pan containment structure 101.

The first lateral panel 251 is formed from a flexible textile sheeting. The first lateral panel 251 further comprises the first lateral port grommet 301. The second lateral panel 252 is formed from a flexible textile sheeting. The second lateral panel 252 further comprises the first lateral starboard grommet 311. The third lateral panel 253 is formed from a flexible textile sheeting. The third lateral panel 253 further comprises the second lateral port grommet 302. The fourth lateral panel 254 is formed from a flexible textile sheeting. The fourth lateral panel 254 further comprises the second lateral starboard grommet 312.

The fifth lateral panel 255 is formed from a flexible textile sheeting. The fifth lateral panel 255 further comprises the third lateral port grommet 303. The sixth lateral panel 256 is formed from a flexible textile sheeting. The sixth lateral panel 256 further comprises the third lateral starboard grommet 313. The seventh lateral panel 257 is formed from a flexible textile sheeting. The seventh lateral panel 257 further comprises the fourth lateral port grommet 304. The eighth lateral panel 258 is formed from a flexible textile sheeting. The eighth lateral panel 258 further comprises the fourth lateral starboard grommet 314.

The first medial panel 261 is a semi-rigid plate structure. The first medial panel 261 further comprises the first medial port grommet 321 and the first medial starboard grommet 331. The second medial panel 262 is a semi-rigid plate structure. The second medial panel 262 further comprises the second medial port grommet 322 and the second medial starboard grommet 332. The third medial panel 263 is a semi-rigid plate structure. The third medial panel 263 further comprises the third medial port grommet 323 and the third medial starboard grommet 333. The anterior panel 111 is a semi-rigid plate structure. The anterior panel 111 further comprises the first anterior port grommet 341 and the first anterior starboard grommet 342.

In the first potential embodiment of the disclosure, the multi-pan containment structure 101 comprises a first storage pan 151, a second storage pan 152, a third storage pan 153, and a fourth storage pan 154.

The first storage pan 151 is a pan-shaped structure. The first storage pan 151 has a rectangular block shape. The first storage pan 151 forms a storage space used to contain domestic articles. The first storage pan 151 is a collapsible structure. The first storage pan 151 forms a storage space that is segregated from the second storage pan 152, the third storage pan 153, and the fourth storage pan 154. The first storage pan 151 is formed from the posterior panel 112, the first inferior panel 241, the first lateral panel 251, the second lateral panel 252, and the first medial panel 261.

The second storage pan 152 is a pan-shaped structure. The second storage pan 152 has a rectangular block shape. The second storage pan 152 forms a storage space used to contain domestic articles. The second storage pan 152 is a collapsible structure. The second storage pan 152 forms a storage space that is segregated from the first storage pan 151, the third storage pan 153, and the fourth storage pan 154.

The third storage pan 153 is a pan-shaped structure. The third storage pan 153 has a rectangular block shape. The third storage pan 153 forms a storage space used to contain domestic articles. The third storage pan 153 is a collapsible structure. The third storage pan 153 forms a storage space that is segregated from the second storage pan 152, the fourth storage pan 154, and the first storage pan 151. The third storage pan 153 is formed from the second medial panel 262, the third inferior panel 243, the fifth lateral panel 255, the sixth lateral panel 256, and the third medial panel 263. The second storage pan 152 is formed from the first medial panel 261, the second inferior panel 242, the third lateral panel 253, the fourth lateral panel 254, and the second medial panel 262.

The fourth storage pan 154 is a pan-shaped structure. The fourth storage pan 154 has a rectangular block shape. The fourth storage pan 154 forms a storage space used to contain domestic articles. The fourth storage pan 154 is a collapsible structure. The fourth storage pan 154 forms a storage space that is segregated from the third storage pan 153, the second storage pan 152, and the first storage pan 151. The fourth storage pan 154 is formed from the third medial panel 263, the fourth inferior panel 244, the seventh lateral panel 257, the eighth lateral panel 258, and the anterior panel 111.

Each of the plurality of handles 102 is a grip that attaches to the multi-pan containment structure 101. Each of the plurality of handles 102 are used to carry and manipulate the multi-pan containment structure 101. The plurality of handles 102 comprises a posterior handle 121, an anterior handle 122, and a lateral handle 123.

The posterior handle 121 comprises a posterior webbing 164. The posterior webbing 164 is a commercially available webbing. The posterior handle 121 is formed from the posterior webbing 164. The posterior handle 121 is a textile-based webbing. The posterior webbing 164 that forms the posterior handle 121 attaches to the posterior panel 112 such that the posterior handle 121 forms a loop structure used as a grip. The posterior handle 121 permanently attaches to the posterior panel 112.

The anterior handle 122 is a textile-based structure. The anterior handle 122 removably attaches to the anterior panel 111 such that the anterior handle 122 forms a loop structure used as a grip. The anterior handle 122 comprises a first looped cord 161 and a tubular webbing 165. The first looped cord 161 comprises a first stopper tube 171 and a second stopper tube 172.

The first looped cord 161 is a cord. The first looped cord 161 inserts through the first stopper tube 171 and the second stopper tube 172. The ends of the first looped cord 161 are joined to form a loop. The first stopper tube 171 is a tubular structure. The first stopper tube 171 is a rigid structure. The second stopper tube 172 is a tubular structure. The second stopper tube 172 is a rigid structure.

The first stopper tube 171 is sized such that the first stopper tube 171 will pass through any grommet selected from the plurality of grommets 117 when the center axis of the first stopper tube 171 is parallel to the center axis of the selected grommet but not pass through the selected grommet when the center axis of the first stopper tube 171 is perpendicular to the center axis of the selected grommet.

The second stopper tube 172 is sized such that the second stopper tube 172 will pass through any grommet selected from the plurality of grommets 117 when the center axis of the second stopper tube 172 is parallel to the center axis of the selected grommet but not pass through the selected grommet when the center axis of the second stopper tube 172 is perpendicular to the center axis of the selected grommet.

The tubular webbing 165 is a commercially available tubular textile through which the first looped cord 161 inserts.

The lateral handle 123 is a textile-based structure. The lateral handle 123 removably attaches to the plurality of lateral panels 115 such that the lateral handle 123 forms a plurality of joined loop structures used as a grip. The lateral handle 123 comprises a second looped cord 162, a third looped cord 163, and a lateral grip 166. The second looped cord 162 comprises a third stopper tube 173 and a fourth stopper tube 174. The third looped cord 163 comprises a fifth stopper tube 175 and a sixth stopper tube 176.

The second looped cord 162 is a cord. The second looped cord 162 inserts through the third stopper tube 173 and the fourth stopper tube 174. The ends of the second looped cord 162 are joined to form a loop. The third stopper tube 173 is a tubular structure. The third stopper tube 173 is a rigid structure. The fourth stopper tube 174 is a tubular structure. The fourth stopper tube 174 is a rigid structure.

The third stopper tube 173 is sized such that the third stopper tube 173 will pass through any grommet selected from the plurality of grommets 117 when the center axis of the third stopper tube 173 is parallel to the center axis of the selected grommet but not pass through the selected grommet when the center axis of the third stopper tube 173 is perpendicular to the center axis of the selected grommet.

The fourth stopper tube 174 is sized such that the fourth stopper tube 174 will pass through any grommet selected from the plurality of grommets 117 when the center axis of the fourth stopper tube 174 is parallel to the center axis of the selected grommet but not pass through the selected grommet when the center axis of the fourth stopper tube 174 is perpendicular to the center axis of the selected grommet.

The third looped cord 163 is a cord. The third looped cord 163 inserts through the fifth stopper tube 175 and the sixth stopper tube 176. The ends of the third looped cord 163 are joined to form a loop. The fifth stopper tube 175 is a tubular structure. The fifth stopper tube 175 is a rigid structure. The sixth stopper tube 176 is a tubular structure. The sixth stopper tube 176 is a rigid structure.

The fifth stopper tube 175 is sized such that the fifth stopper tube 175 will pass through any grommet selected from the plurality of grommets 117 when the center axis of the fifth stopper tube 175 is parallel to the center axis of the selected grommet but not pass through the selected grommet when the center axis of the fifth stopper tube 175 is perpendicular to the center axis of the selected grommet.

The sixth stopper tube 176 is sized such that the sixth stopper tube 176 will pass through any grommet selected from the plurality of grommets 117 when the center axis of the sixth stopper tube 176 is parallel to the center axis of the selected grommet but not pass through the selected grommet when the center axis of the sixth stopper tube 176 is perpendicular to the center axis of the selected grommet.

The lateral grip 166 is a commercially available cushion that wraps around the second looped cord 162 and the third looped cord 163.

The wheel structure 103 is a mechanical structure that allows the multi-pan containment structure 101 to roll along a supporting surface. The wheel structure 103 removably attaches to the inferior surface of the multi-pan containment structure 101. The wheel structure 103 comprises an axle 131, a port wheel 132, and a starboard wheel 133. The axle 131 is a cylindrical shaft. The axle 131 attaches the port wheel 132 and the starboard wheel 133 to the inferior shell 113 of the multi-pan containment structure 101. The port wheel 132 is a wheel. The port wheel 132 attaches to the axle 131 such that the port wheel 132 rotates freely around the axle 131. The starboard wheel 133 is a wheel. The starboard wheel 133 attaches to the axle 131 such that the starboard wheel 133 rotates freely around the axle 131.

Each of the plurality of hook and loop fasteners 104 is a fastening device. The plurality of hook and loop fasteners 104 attaches the wheel structure 103 to the inferior surface of the multi-pan containment structure 101. The plurality of hook and loop fasteners 104 secures each pan contained in the multi-pan containment structure 101 in a collapsed position. The plurality of hook and loop fasteners 104 comprises a compartment fastener 141 and a wheel fastener 142.

The compartment fastener 141 is a fastening structure. The compartment fastener 141 secures each pan contained in the multi-pan containment structure 101 into a collapsed position. The compartment fastener 141 is formed as a hook and loop fastener. The compartment fastener 141 comprises a first hook/loop surface 181, a second hook/loop surface 182, a third hook/loop surface 183, a fourth hook/loop surface 184, a fifth hook/loop surface 185, a sixth hook/loop surface 186, a seventh hook/loop surface 187, an eighth hook/loop surface 188, a ninth hook/loop surface 189, a tenth hook/loop surface 190, an eleventh hook/loop surface 191, and a twelfth hook/loop surface 192.

The first hook/loop surface 181 is a flap. The first hook/loop surface 181 forms a hook/loop surface. The first hook/loop surface 181 attaches to the exterior surface of the anterior panel 111.

The second hook/loop surface 182 is a hook/loop surface. The hook/loop surface formed by the second hook/loop surface 182 is opposite to the hook/loop surface used for the first hook/loop surface 181. The second hook/loop surface 182 mounts on the interior surface of the anterior panel 111. The first hook/loop surface 181 attaches to the second hook/loop surface 182 when each storage pan contained in the multi-pan containment structure 101 is expanded.

The third hook/loop surface 183 is a hook/loop surface. The hook/loop surface formed by the third hook/loop surface 183 is opposite to the hook/loop surface used for the first hook/loop surface 181. The third hook/loop surface 183 mounts on the interior surface of the third medial panel 263 that is distal from the anterior panel 111. The first hook/loop surface 181 attaches to the third hook/loop surface 183 when the fourth storage pan 154 is placed in a collapsed position.

The fourth hook/loop surface 184 is a hook/loop surface. The hook/loop surface formed by the fourth hook/loop surface 184 is opposite to the hook/loop surface used for the first hook/loop surface 181. The fourth hook/loop surface 184 mounts on the interior surface of the second medial panel 262 that is distal from the anterior panel 111. The first hook/loop surface attaches to the fourth hook/loop surface 184 when the fourth storage pan 154 and the third storage pan 153 are placed in a collapsed position.

The fifth hook/loop surface 185 is a hook/loop surface. The hook/loop surface formed by the fifth hook/loop surface 185 is opposite to the hook/loop surface used for the first hook/loop surface 181. The fifth hook/loop surface 185 mounts on the interior surface of the first medial panel 261 that is distal from the anterior panel 111. The first hook/loop surface 181 attaches to the fifth hook/loop surface 185 when the fourth storage pan 154, the third storage pan 153, and the second storage pan 152 are placed in a collapsed position.

The sixth hook/loop surface 186 is a hook/loop surface. The hook/loop surface formed by the sixth hook/loop surface 186 is opposite to the hook/loop surface used for the first hook/loop surface 181. The sixth hook/loop surface 186 mounts on the exterior surface of the posterior panel 112. The first hook/loop surface 181 attaches to the sixth hook/loop surface 186 when each storage pan contained in the multi-pan containment structure 101 is placed in a collapsed position.

The seventh hook/loop surface 187 is a flap. The seventh hook/loop surface 187 forms a hook/loop surface. The hook/loop surface formed by the seventh hook/loop surface 187 is identical to the hook/loop surface used for the first hook/loop surface 181. The seventh hook/loop surface 187 attaches to the exterior surface of the anterior panel 111.

The eighth hook/loop surface 188 is a hook/loop surface. The hook/loop surface formed by the eighth hook/loop surface 188 is opposite to the hook/loop surface used for the seventh hook/loop surface 187. The eighth hook/loop surface 188 mounts on the exterior surface of the inferior shell 113 underneath the expanded position of the fourth inferior panel 244. The seventh hook/loop surface 187 attaches to the eighth hook/loop surface 188 when each storage pan contained in the multi-pan containment structure 101 is expanded.

The ninth hook/loop surface 189 is a hook/loop surface. The hook/loop surface formed by the ninth hook/loop surface 189 is opposite to the hook/loop surface used for the seventh hook/loop surface 187. The ninth hook/loop surface 189 mounts on the exterior surface of the inferior shell 113 underneath the expanded position of the third inferior panel 243. The seventh hook/loop surface 187 attaches to the ninth hook/loop surface 189 when the fourth storage pan 154 is placed in a collapsed position.

The tenth hook/loop surface 190 is a hook/loop surface. The hook/loop surface formed by the tenth hook/loop surface 190 is opposite to the hook/loop surface used for the seventh hook/loop surface 187. The tenth hook/loop surface 190 mounts on the exterior surface of the inferior shell 113 underneath the expanded position of the second inferior panel 242. The seventh hook/loop surface 187 attaches to the tenth hook/loop surface 190 when the fourth storage pan 154 and the third storage pan 153 are placed in a collapsed position.

The eleventh hook/loop surface 191 is a hook/loop surface. The hook/loop surface formed by the eleventh hook/loop surface 191 is opposite to the hook/loop surface used for the seventh hook/loop surface 187. The eleventh hook/loop surface 191 mounts on the exterior surface of the inferior shell 113 underneath the expanded position of the first inferior panel 241. The seventh hook/loop surface 187 attaches to the eleventh hook/loop surface 191 when the fourth storage pan 154, the third storage pan 153, and the second storage pan 152 are placed in a collapsed position.

The twelfth hook/loop surface 192 is a hook/loop surface. The hook/loop surface formed by the twelfth hook/loop surface 192 is opposite to the hook/loop surface used for the seventh hook/loop surface 187. The twelfth hook/loop surface 192 mounts on the exterior surface of the posterior panel 112. The seventh hook/loop surface 187 attaches to the twelfth hook/loop surface 192 when each storage pan contained in the multi-pan containment structure 101 is placed in a collapsed position.

The wheel fastener 142 is a fastening structure. The wheel fastener 142 is formed as a hook and loop fastener. The wheel fastener 142 attaches the axle 131 of the wheel structure 103 to the inferior shell 113 to the multi-pan containment structure 101. The wheel fastener 142 attaches the wheel structure 103 to the multi-pan containment structure 101 such that the multi-pan containment structure 101 will roll over a supporting surface. The wheel fastener 142 comprises a thirteenth hook/loop surface 193 and a fourteenth hook/loop surface 194.

The thirteenth hook/loop surface 193 is a hook/loop surface. The hook/loop surface formed by the thirteenth hook/loop surface 193 is opposite to the hook/loop surface used for the fourteenth hook/loop surface 194. The thirteenth hook/loop surface 193 mounts on the exterior surface of the inferior shell 113 underneath the expanded position of the first inferior panel 241. The fourteenth hook/loop surface 194 is a flap. The fourteenth hook/loop surface 194 forms a hook/loop surface. The fourteenth hook/loop surface 194 is a hook/loop surface. The hook/loop surface formed by the fourteenth hook/loop surface 194 is opposite to the hook/loop surface used for the thirteenth hook/loop surface 193. The fourteenth hook/loop surface 194 mounts on the exterior surface of the inferior shell 113 underneath the expanded position of the first inferior panel 241.

The wheel fastener 142 attaches the axle 131 of the wheel structure 103 to the multi-pan containment structure 101 by placing the axle 131 between the thirteenth hook/loop surface 193 and the fourteenth hook/loop surface 194 and pressing the fourteenth hook/loop surface 194 into the thirteenth hook/loop surface 193.

To collapse the multi-pan containment structure 101:

The fourth inferior panel 244 rotates to a position parallel to the third medial panel 263. The third inferior panel 243 rotates to a position parallel to the second medial panel 262. The second inferior panel 242 rotates to a position parallel to the first medial panel 261. The first inferior panel 241 rotates to a position parallel to the posterior panel 112.

The first stopper tube 171 inserts through a set of grommets selected from the group consisting of: a) the set of grommets comprising the first medial port grommet 321, the second medial port grommet 322, the third medial port grommet 323, and the first anterior port grommet 341; and, b) the set of grommets comprising first medial starboard grommet 331, the second medial starboard grommet 332, the third medial starboard grommet 333, and the first anterior starboard grommet 342.

The second stopper tube 172 inserts through the set of grommets remaining after the first stopper tube 171 has been installed.

The following five paragraphs describe the assembly of the multi-pan containment structure 101.

To form the first storage pan 151: The posterior panel 112 attaches to the first lateral panel 251, the second lateral panel 252, and the first inferior panel 241. The first inferior panel 241 attaches to the posterior panel 112 such that the first inferior panel 241 rotates relative to the posterior panel 112. The first lateral panel 251 attaches to the posterior panel 112 and the first medial panel 261. The second lateral panel 252 attaches to the posterior panel 112 and the first medial panel 261. The first medial panel 261 attaches to the first lateral panel 251 and the second lateral panel 252.

To form the second storage pan 152: The first medial panel 261 attaches to the third lateral panel 253, the fourth lateral panel 254, and the second inferior panel 242. The second inferior panel 242 attaches to the first medial panel 261 such that the second inferior panel 242 rotates relative to the first medial panel 261. The third lateral panel 253 attaches to the first medial panel 261 and the second medial panel 262. The fourth lateral panel 254 attaches to the first medial panel 261 and the second medial panel 262. The second medial panel 262 attaches to the third lateral panel 253 and the fourth lateral panel 254.

To form the third storage pan 153: The second medial panel 262 attaches to the fifth lateral panel 255, the sixth lateral panel 256, and the third inferior panel 243. The third inferior panel 243 attaches to the second medial panel 262 such that the third inferior panel 243 rotates relative to the second medial panel 262. The fifth lateral panel 255 attaches to the second medial panel 262 and the third medial panel 263. The sixth lateral panel 256 attaches to the second medial panel 262 and the third medial panel 263. The third medial panel 263 attaches to the fifth lateral panel 255 and the sixth lateral panel 256.

To form the fourth storage pan 154: The third medial panel 263 attaches to the seventh lateral panel 257, the eighth lateral panel 258, and the fourth inferior panel 244. The fourth inferior panel 244 attaches to the third medial panel 263 such that the fourth inferior panel 244 rotates relative to the third medial panel 263. The seventh lateral panel 257 attaches to the third medial panel 263 and the anterior panel 111. The eighth lateral panel 258 attaches to the third medial panel 263 and the anterior panel 111. The anterior panel 111 attaches to the seventh lateral panel 257 and the eighth lateral panel 258.

The inferior shell 113 attaches to the first lateral panel 251, the second lateral panel 252, the third lateral panel 253, the fourth lateral panel 254, the fifth lateral panel 255, the sixth lateral panel 256, the seventh lateral panel 257, the eighth lateral panel 258, the first medial panel 261, the second medial panel 262, the third medial panel 263, the anterior panel 111 and the posterior panel 112.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Anterior: As used in this disclosure, anterior is a term that is used to refer to the front side or direction of a structure. When comparing two objects, the anterior object is the object that is closer to the front of the structure.

Axle: As used in this disclosure, an axle is a cylindrical shaft that is inserted through the center of one or more wheels such that the axis of rotation of the one or more wheels and the center axis of the axle are aligned.

Bag: As used in this disclosure, a bag is a container made of a flexible material. The bag has a single opening which allows the bag to receive the items to be contained.

Bow: As used in this disclosure, the bow refers to the anterior side of an object, vehicle, or vessel. Specifically, the bow refers to the most forward element of the object in the direction of the primary sense of direction of the object, vehicle, or vessel.

Cart: As used in this disclosure, a cart is a small vehicle intended to be moved by a person. A synonym for cart is hand cart.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Collapsible: As used in this disclosure, the terms collapsible refers to an object that is configured such that the volume of the object is adjustable. The verb collapse means that the volume of the object is adjusted from a larger volume to a smaller volume. The verbs expand and deploy mean that the volume of the object is adjusted from a smaller volume to a larger volume.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Cushion: As used in this disclosure, a cushion is a structure used to prevent injury or damage to a person or object.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Eyelet: As used in this disclosure, an eyelet is a ring-shaped mechanical structure intended to reinforce and protect the edges of an aperture.

Flap: As used in this disclosure, a flap is a sheeting or textile that is attached to a surface using one edge of the sheeting or textile such that the sheeting or textile rotates and hangs freely from the surface. The edge of the sheeting or textile that is distal from the secured edge is referred to as the free edge.

Flexible: As used in this disclosure, flexible refers to an object or material that will deform when a force is applied to it but that will not necessarily return to its original shape when the deforming force is removed.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is a term that relates a first object to a second object. When the first object is closer to the bow of a vehicle, the first object is said to be forward of the second object. The term is commonly used on vessels and vehicles.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Grommet: As used in this disclosure, a grommet is an eyelet placed in a hole in a textile, sheet, or panel that protects a rope hook or cable passed through it and to protect the textile, sheet, or panel from being torn.

Handle: As used in this disclosure, a handle is an object by which a tool, object, or door is held or manipulated with the hand.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein an end of prism structure of the pan and a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rigid Structure: As used in this disclosure, a rigid structure is a solid structure formed from an inelastic material that resists changes in shape. A rigid structure will permanently deform as it fails under a force.

Ring: As used in this disclosure, a ring is a term that is used to describe a disk-like structure through which an aperture is formed.

Roll: As used in this disclosure, the term roll refers to the motion of an object that is facilitated by the rotation of one or more wheels or casters.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sheeting: As used in this disclosure, a sheeting is a material, such as a paper, textile, a plastic, or a metal foil, in the form of a thin flexible layer or layers.

Strap: As used in this disclosure a strap is a strip of leather, cloth, or other flexible material, often with a buckle, that is used to fasten, secure, carry, or hold onto something.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Textile: As used in this disclosure, a textile is a material that is woven, knitted, braided or felted. Synonyms in common usage for this definition include fabric and cloth.

Tube: As used in this disclosure, the term tube is used to describe a rigid hollow prism-shaped device with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Tubular Textile: As used in this disclosure, a tubular textile is a textile that is woven, knitted, or braided into a seamless tube-like shape.

Vehicle: As used in this disclosure, a vehicle is a device that is used for transporting passengers, goods, or equipment. The term motorized vehicle refers to a vehicle can move under power provided by an electric motor or an internal combustion engine.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The two surfaces of a webbing with the greatest surface area are called the faces of the webbing.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A reusable shopping bag comprising
a multi-pan containment structure, a plurality of handles, a wheel structure, and a plurality of hook and loop fasteners;
wherein the plurality of handles, the wheel structure, and the plurality of hook and loop fasteners attach to the multi-pan containment structure;
wherein the wheel structure removably attaches to the multi-pan containment structure;
wherein the reusable shopping bag is a cart;
wherein the reusable shopping bag is a container;
wherein the reusable shopping bag is a rolling structure;
wherein the reusable shopping bag is a collapsible structure;
wherein the reusable shopping bag is segmented such that contents contained in the reusable shopping bag are segregated within the reusable shopping bag;
wherein the multi-pan containment structure comprises an anterior panel, a posterior panel, an inferior shell, a plurality of inferior panels, a plurality of lateral panels, a plurality of medial panels, and a plurality of grommets;

wherein during the collapse of the storage pan associated with an inferior panel selected from the plurality of inferior panels, the selected inferior panel will rotate from a position perpendicular to the attached selected panel to a position perpendicular to the attached selected panel;

wherein the direction of rotation of each of the plurality of inferior panels is towards the anterior panel.

2. The reusable shopping bag according to claim 1
wherein the multi-pan containment structure is collapsible;
wherein the multi-pan containment structure is a containment vessel;
wherein the multi-pan containment structure is a prism-shaped structure;
wherein the multi-pan containment structure is a hollow structure;
wherein the multi-pan containment structure forms a rectangular block structure;
wherein each pan in the multi-pan containment structure is collapsible;
wherein the multi-pan containment structure collapses by collapsing each pan within the multi-pan containment structure;
wherein each of the plurality of handles is a grip;
wherein the wheel structure is a mechanical structure that allows the multi-pan containment structure to roll along a supporting surface;
wherein the wheel structure removably attaches to the multi-pan containment structure;
wherein each of the plurality of hook and loop fasteners is a fastening device;
wherein the plurality of hook and loop fasteners performs a function selected from the group consisting of: a) removably attaching the wheel structure to the multi-pan containment structure; and, b) securing the multi-pan containment structure into a collapsed position selected from a plurality of collapsed positions.

3. The reusable shopping bag according to claim 2
wherein the anterior panel forms a portion of the vertical containment of multi-pan containment structure when the multi-pan containment structure is used for storage;
wherein the anterior panel is the surface of the multi-pan containment structure that leads the multi-pan containment structure into the primary sense of direction of the multi-pan containment structure;
wherein the posterior panel is the surface of the multi-pan containment structure that is distal from the multi-pan containment structure;
wherein the inferior shell is a sheeting that forms the exterior face of the inferior surface of the multi-pan containment structure;
wherein the inferior shell supports each of the plurality of inferior panels when the selected inferior panel is in an expanded position;
wherein each of the plurality of inferior panels forms the inferior containment surface of its associated storage pan;
wherein each of the plurality of inferior panels attaches to a panel selected from the group consisting of the plurality of medial panels and the posterior panel;
wherein the plurality of lateral panels forms a portion of the vertical containment of multi-pan containment structure when the multi-pan containment structure is used for storage;
wherein the plurality of lateral panels form the lateral vertical surfaces of the multi-pan containment structure;
wherein each of the plurality of medial panels installs within the hollow interior of the multi-pan containment structure such that the faces of the disk structure of each of the plurality of medial panels are perpendicular to the faces of the disk structure of each of the plurality of lateral panels;
wherein each of the plurality of medial panels segregates the hollow interior storage space formed by the exterior surfaces of the multi-pan containment structure into individually segregated storage pans;
wherein each of the plurality of grommets is a protected aperture formed through a panel selected from the group consisting of anterior panel, the plurality of lateral panels, and the plurality of medial panels;
wherein by protected is meant that each of the plurality of grommets is protected by an eyelet that ensures the integrity of the edges of the aperture formed by any selected grommet;
wherein each of the plurality of grommets forms an anchor point to which a handle selected from the plurality of handles attaches.

4. The reusable shopping bag according to claim 3
wherein the wheel structure comprises an axle, a port wheel, and a starboard wheel;
wherein the axle is a cylindrical shaft;
wherein the axle attaches the port wheel and the starboard wheel to the inferior shell of the multi-pan containment structure;
wherein the port wheel is a wheel;
wherein the port wheel attaches to the axle such that the port wheel rotates freely around the axle;
wherein the starboard wheel is a wheel;
wherein the starboard wheel attaches to the axle such that the starboard wheel rotates freely around the axle;
wherein the plurality of hook and loop fasteners comprises a compartment fastener and a wheel fastener;
wherein the compartment fastener is a fastening structure;
wherein the compartment fastener secures each pan contained in the multi-pan containment structure into a collapsed position;
wherein the compartment fastener is formed as a hook and loop fastener;
wherein the wheel fastener is a fastening structure;
wherein the wheel fastener is formed as a hook and loop fastener;
wherein the wheel fastener attaches the axle of the wheel structure to the inferior shell to the multi-pan containment structure;
wherein the wheel fastener attaches the wheel structure to the multi-pan containment structure such that the multi-pan containment structure will roll over a supporting surface.

5. The reusable shopping bag according to claim 4
wherein the anterior panel is a rectangular disk-shaped structure;
wherein the anterior panel is a semi-rigid structure;
wherein the posterior panel is a rectangular disk-shaped structure;
wherein the posterior panel is a rigid structure;
wherein the posterior panel forms a portion of the vertical containment of multi-pan containment structure when the multi-pan containment structure is used for storage;
wherein the inferior shell is a textile-based sheeting;

wherein each of the plurality of inferior panels forms a supporting surface within a storage pan selected from the multi-pan containment structure.

6. The reusable shopping bag according to claim 4
wherein the plurality of inferior panels comprises a first inferior panel, a second inferior panel, a third inferior panel, and a fourth inferior panel;
wherein the first inferior panel is a rigid rectangular panel structure;
wherein the first inferior panel has a disk shape;
wherein the first inferior panel forms the inferior supporting surface of the first storage pan of the multi-pan containment structure;
wherein the rotation of the first inferior panel is limited by the inferior shell;
wherein the first inferior panel is supported by the inferior shell;
wherein the second inferior panel is a rigid rectangular panel structure;
wherein the second inferior panel has a disk shape;
wherein the second inferior panel forms the inferior supporting surface of the second storage pan of the multi-pan containment structure;
wherein the rotation of the second inferior panel is limited by the inferior shell;
wherein the second inferior panel is supported by the inferior shell;
wherein the third inferior panel is a rigid rectangular panel structure;
wherein the third inferior panel has a disk shape;
wherein the third inferior panel forms the inferior supporting surface of the third storage pan of the multi-pan containment structure;
wherein the rotation of the third inferior panel is limited by the inferior shell;
wherein the third inferior panel is supported by the inferior shell;
wherein the fourth inferior panel is a rigid rectangular panel structure;
wherein the fourth inferior panel has a disk shape;
wherein the fourth inferior panel forms the inferior supporting surface of the fourth storage pan of the multi-pan containment structure;
wherein the rotation of the fourth inferior panel is limited by the inferior shell;
wherein the fourth inferior panel is supported by the inferior shell.

7. The reusable shopping bag according to claim 6
wherein the plurality of lateral panels comprises a first lateral panel, a second lateral panel, a third lateral panel, a fourth lateral panel, a fifth lateral panel, a sixth lateral panel, a seventh lateral panel, and an eighth lateral panel;
wherein the first lateral panel is a flexible textile sheeting;
wherein the second lateral panel is a flexible textile sheeting;
wherein the third lateral panel is a flexible textile sheeting;
wherein the fourth lateral panel is a flexible textile sheeting;
wherein the fifth lateral panel is a flexible textile sheeting;
wherein the sixth lateral panel is a flexible textile sheeting;
wherein the seventh lateral panel is a flexible textile sheeting;
wherein the eighth lateral panel is a flexible textile sheeting.

8. The reusable shopping bag according to claim 7
wherein each of the plurality of medial panels is a rectangular disk-shaped structure;
wherein each of the plurality of medial panels is a semi-rigid structure;
wherein the faces of the disk-structure of each of the plurality of medial panels are parallel to each other;
wherein the faces of the disk-structure of each of the plurality of medial panels are parallel to the anterior panel;
wherein the faces of the disk-structure of each of the plurality of medial panels are parallel to the posterior panel;
wherein the plurality of medial panels comprises a first medial panel, a second medial panel, and a third medial panel;
wherein the first medial panel is a semi-rigid rectangular panel structure;
wherein the second medial panel is a semi-rigid rectangular panel structure;
wherein the third medial panel is a semi-rigid rectangular panel structure.

9. The reusable shopping bag according to claim 8
wherein the plurality of grommets comprises a first lateral port grommet, a second lateral port grommet, a third lateral port grommet, a fourth lateral port grommet, a first lateral starboard grommet, a second lateral starboard grommet, a third lateral starboard grommet, a fourth lateral starboard grommet, a first medial port grommet, a second medial port grommet, a third medial port grommet, a first medial starboard grommet, a second medial starboard grommet, a third medial starboard grommet, a first anterior port grommet, and a first anterior starboard grommet;
wherein the first lateral port grommet is a grommet that is formed through the first lateral panel;
wherein the second lateral port grommet is a grommet that is formed through the third lateral panel;
wherein the third lateral port grommet is a grommet that is formed through the fifth lateral panel;
wherein the fourth lateral port grommet is a grommet that is formed through the seventh lateral panel;
wherein the first lateral starboard grommet is a grommet that is formed through the second lateral panel;
wherein the second lateral starboard grommet is a grommet that is formed through the fourth lateral panel;
wherein the third lateral starboard grommet is a grommet that is formed through the sixth lateral panel;
wherein the fourth lateral starboard grommet is a grommet that is formed through the eighth lateral panel;
wherein the first medial port grommet is a grommet that is formed through the port half of the first medial panel;
wherein the second medial port grommet is a grommet that is formed through the port half of the second medial panel;
wherein the third medial port grommet is a grommet that is formed through the port half of the third medial panel;
wherein the first medial starboard grommet is a grommet that is formed through the starboard half of the first medial panel;
wherein the second medial starboard grommet is a grommet that is formed through the starboard half of the second medial panel;
wherein the third medial starboard grommet is a grommet that is formed through the starboard half of the third medial panel;

wherein the first anterior port grommet is a grommet that is formed through the port half of the anterior panel;

wherein the first anterior starboard grommet is a grommet that is formed through the starboard half of the anterior panel.

10. The reusable shopping bag according to claim 9 wherein the first medial panel is a semi-rigid plate structure;

wherein the second medial panel is a semi-rigid plate structure;

wherein the third medial panel is a semi-rigid plate structure;

wherein the anterior panel is a semi-rigid plate structure;

wherein the first lateral panel forms the port side vertical boundary of the space contained by the first storage pan;

wherein the second lateral panel forms the starboard side vertical boundary of the space contained by the first storage pan;

wherein the third lateral panel forms the port side vertical boundary of the space contained by the second storage pan;

wherein the fourth lateral panel forms the starboard side vertical boundary of the space contained by the second storage pan;

wherein the fifth lateral panel forms the port side vertical boundary of the space contained by the third storage pan;

wherein the sixth lateral panel forms the starboard side vertical boundary of the space contained by the third storage pan;

wherein the seventh lateral panel forms the port side vertical boundary of the space contained by the fourth storage pan;

wherein the eighth lateral panel forms the starboard side vertical boundary of the space contained by the fourth storage pan;

wherein the first medial panel forms the vertical boundary of between the spaces contained by the first storage pan and the second storage pan;

wherein the second medial panel forms the vertical boundary of between the spaces contained by the second storage pan and the third storage pan;

wherein the third medial panel forms the vertical boundary of between the spaces contained by the third storage pan and the fourth storage pan.

11. The reusable shopping bag according to claim 10 wherein the multi-pan containment structure comprises a first storage pan, a second storage pan, a third storage pan, and a fourth storage pan;

wherein the first storage pan is a pan-shaped structure;

wherein the first storage pan has a rectangular block shape;

wherein the first storage pan forms a storage space used to contain domestic articles;

wherein the first storage pan is a collapsible structure;

wherein the first storage pan forms a storage space that is segregated from the second storage pan, the third storage pan, and the fourth storage pan;

wherein the first storage pan is formed from the posterior panel, the first inferior panel, the first lateral panel, the second lateral panel, and the first medial panel;

wherein the second storage pan is a pan-shaped structure;

wherein the second storage pan has a rectangular block shape;

wherein the second storage pan forms a storage space used to contain domestic articles;

wherein the second storage pan is a collapsible structure;

wherein the second storage pan forms a storage space that is segregated from the first storage pan, the third storage pan, and the fourth storage pan;

wherein the third storage pan is a pan-shaped structure;

wherein the third storage pan has a rectangular block shape;

wherein the third storage pan forms a storage space used to contain domestic articles;

wherein the third storage pan is a collapsible structure;

wherein the third storage pan forms a storage space that is segregated from the second storage pan, the fourth storage pan, and the first storage pan;

wherein the third storage pan is formed from the second medial panel, the third inferior panel, the fifth lateral panel, the sixth lateral panel, and the third medial panel;

wherein the second storage pan is formed from the first medial panel, the second inferior panel, the third lateral panel, the fourth lateral panel, and the second medial panel;

wherein the fourth storage pan is a pan-shaped structure;

wherein the fourth storage pan has a rectangular block shape;

wherein the fourth storage pan forms a storage space used to contain domestic articles;

wherein the fourth storage pan is a collapsible structure;

wherein the fourth storage pan forms a storage space that is segregated from the third storage pan, the second storage pan, and the first storage pan;

wherein the fourth storage pan is formed from the third medial panel, the fourth inferior panel, the seventh lateral panel, the eighth lateral panel, and the anterior panel.

12. The reusable shopping bag according to claim 11 wherein the plurality of handles comprises a posterior handle, an anterior handle, and a lateral handle;

wherein the posterior handle comprises a posterior webbing;

wherein the posterior handle is formed from the posterior webbing;

wherein the posterior handle is a textile-based webbing;

wherein the posterior webbing that forms the posterior handle attaches to the posterior panel such that the posterior handle forms a loop structure;

wherein the posterior handle permanently attaches to the posterior panel;

wherein the anterior handle is a textile-based structure;

wherein the anterior handle removably attaches to the anterior panel such that the anterior handle forms a loop structure used as a grip;

wherein the anterior handle comprises a first looped cord and a tubular webbing;

wherein the first looped cord comprises a first stopper tube and a second stopper tube;

wherein the first looped cord is a cord;

wherein the first looped cord inserts through the first stopper tube and the second stopper tube;

wherein the ends of the first looped cord are joined to form a loop;

wherein the first stopper tube is a tubular structure;

wherein the first stopper tube is a rigid structure;

wherein the second stopper tube is a tubular structure;

wherein the second stopper tube is a rigid structure;

wherein the lateral handle is a textile-based structure;

wherein the lateral handle removably attaches to the plurality of lateral panels such that the lateral handle forms a plurality of joined loop structures used as a grip;
wherein the lateral handle comprises a second looped cord, a third looped cord, and a lateral grip;
wherein the second looped cord comprises a third stopper tube and a fourth stopper tube;
wherein the third looped cord comprises a fifth stopper tube and a sixth stopper tube;
wherein the second looped cord is a cord;
wherein the second looped cord inserts through the third stopper tube and the fourth stopper tube;
wherein the ends of the second looped cord are joined to form a loop;
wherein the third stopper tube is a tubular structure;
wherein the third stopper tube is a rigid structure;
wherein the fourth stopper tube is a tubular structure;
wherein the fourth stopper tube is a rigid structure;
wherein the third looped cord is a cord;
wherein the third looped cord inserts through the fifth stopper tube and the sixth stopper tube;
wherein the ends of the third looped cord are joined to form a loop;
wherein the fifth stopper tube is a tubular structure;
wherein the fifth stopper tube is a rigid structure;
wherein the sixth stopper tube is a tubular structure;
wherein the sixth stopper tube is a rigid structure;
wherein the lateral grip is a cushion that wraps around the second looped cord and the third looped cord.

13. The reusable shopping bag according to claim 12
wherein the first stopper tube is sized such that the first stopper tube will pass through any grommet selected from the plurality of grommets when the center axis of the first stopper tube is parallel to the center axis of the selected grommet but not pass through the selected grommet when the center axis of the first stopper tube is perpendicular to the center axis of the selected grommet;
wherein the second stopper tube is sized such that the second stopper tube will pass through any grommet selected from the plurality of grommets when the center axis of the second stopper tube is parallel to the center axis of the selected grommet but not pass through the selected grommet when the center axis of the second stopper tube is perpendicular to the center axis of the selected grommet;
wherein the third stopper tube is sized such that the third stopper tube will pass through any grommet selected from the plurality of grommets when the center axis of the third stopper tube is parallel to the center axis of the selected grommet but not pass through the selected grommet when the center axis of the third stopper tube is perpendicular to the center axis of the selected grommet;
wherein the fourth stopper tube is sized such that the fourth stopper tube will pass through any grommet selected from the plurality of grommets when the center axis of the fourth stopper tube is parallel to the center axis of the selected grommet but not pass through the selected grommet when the center axis of the fourth stopper tube is perpendicular to the center axis of the selected grommet;
wherein the fifth stopper tube is sized such that the fifth stopper tube will pass through any grommet selected from the plurality of grommets when the center axis of the fifth stopper tube is parallel to the center axis of the selected grommet but not pass through the selected grommet when the center axis of the fifth stopper tube is perpendicular to the center axis of the selected grommet;
wherein the sixth stopper tube is sized such that the sixth stopper tube will pass through any grommet selected from the plurality of grommets when the center axis of the sixth stopper tube is parallel to the center axis of the selected grommet but not pass through the selected grommet when the center axis of the sixth stopper tube is perpendicular to the center axis of the selected grommet.

* * * * *